April 4, 1961 L. J. KRAMER 2,978,041
LAWN EDGERS HAVING OSCILLATING BLADES
Filed Oct. 3, 1958
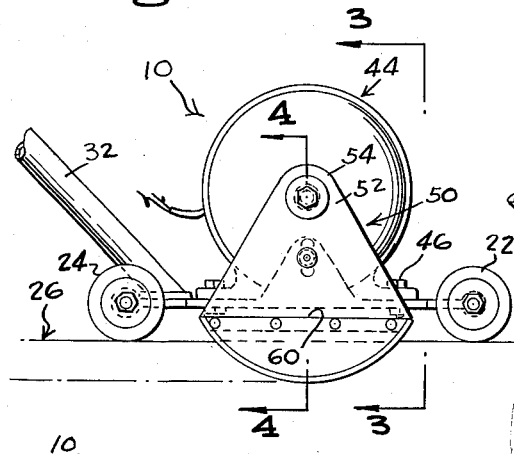
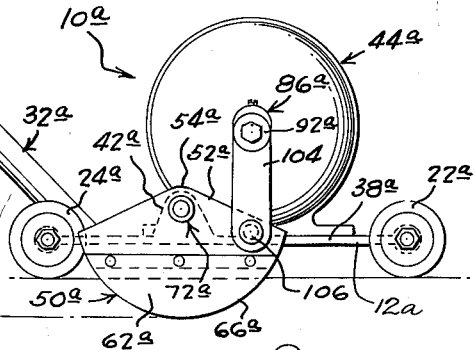
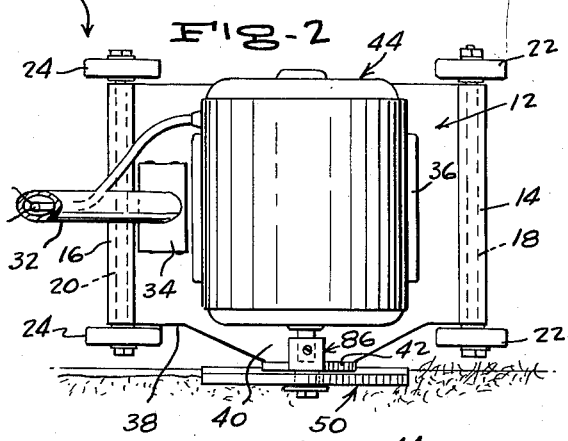
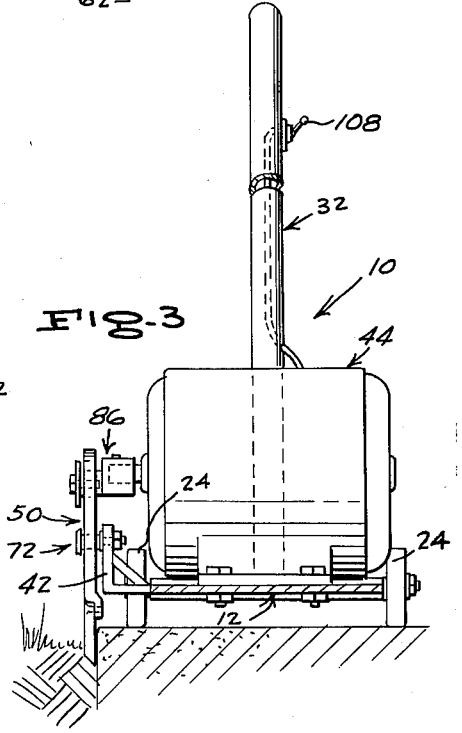
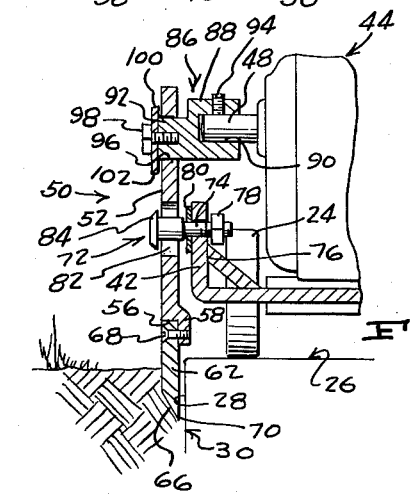
INVENTOR.
LAMAR J. KRAMER
BY
McMorrow, Berman + Davidson
ATTORNEYS United States Patent Office 2,978,041
Patented Apr. 4, 1961

2,978,041

LAWN EDGERS HAVING OSCILLATING BLADES

Lamar J. Kramer, El Segundo, Calif.
(528 E. Maple St., 1, Glendale 5, Calif.)

Filed Oct. 3, 1958, Ser. No. 765,127

2 Claims. (Cl. 172—15)

This invention relates to improvements in lawn edgers having moving blades, and more particularly to improved power-operated lawn edgers having blades whose cutting edges oscillate in contact with earth and grass in edging lawns.

The primary object of the invention is to provide lawn edgers of the character indicated with which lawn-edging operations can be performed more efficiently, more rapidly and more accurately with less effort.

A further object of the invention is to provide lawn edgers of the character indicated above which are of simple construction, are composed of a small number of simple and easily assembled and disassembled parts, which are readily replaceable when desired, and which can be made in durable and rugged forms at relatively low cost.

Other important objects and advantageous features of the invention will be apparent from the following description and the accompanying drawings, wherein, for purposes of illustration only, a specific form of the invention is set forth in detail.

In the drawings:

Figure 1 is a side elevation of a lawn edger of the present invention, positioned relative to a lawn edge and a pavement edge;

Figure 2 is a top plan view of Figure 1;

Figure 3 is a sectional view taken from the line 3—3 of Figure 1;

Figure 4 is an enlarged fragmentary vertical transverse section taken on the line 4—4 of Figure 1; and Figure 5 is a side elevation of another form of lawn edger of the invention.

Referring in detail to the drawings, wherein like or similar numerals designate like parts throughout the several views, and first to Figures 1 to 4, the lawn edger therein shown and generally designated 10, comprises a generally rectangular horizontal base 12, preferably in the form of a single heavy gauge rigid plate, on whose front and rear ends are fixed transverse axle tubes 14 and 16, respectively, which have axles 18 and 20 extending therethrough which have ground-engaging wheels 22 and 24, respectively, on their ends, and which are arranged to rollably support the base 12 above and parallel to a pavement 26 having a vertical longitudinal edge 28 extending along a lawn edge 30 to be trimmed and edged. A rearwardly inclined handle tube 32 is centrally fixed, as indicated at 34, at its lower end upon the base 12 near the rear axle tube 16.

The base 12 is preferably centrally apertured, as indicated at 36, to lighten the base, and the side edge 38 of the base has thereon a lateral extension 40 at a mid-length point thereof, whose laterally outward end reaches laterally beyond the wheels 22 and 24 at the same side of the base, and terminates in an upstanding braced bearing bracket 42, as clearly shown in Figures 3 and 4.

A suitable motor, such as an electric motor 44 herein shown, is suitably mounted upon the base 12, as indicated at 46, and has a lateral horizontal drive shaft 48 which extends above and is vertically aligned with the base extension 40. It will be understood that any other suitable form of motor, such as a gasoline engine, can be used in place of the electric motor.

The blade assembly 50 of the edger 10 is of generally segmental form and comprises a segmental blade holder plate 52 having an upper apex portion 54 and a straight lower edge 56. Fixed on or integral with the lateral inward side of the plate 52 and depending below and extending along the lower edge 56 is a blade backing flange 58, which, with the edge 56, forms a seat for the straight upper edge 60 of a replaceable blade 62, which has an arcuate lower cutting edge 66, which is preferably concentric with the axis of the shaft 48. As shown in Figure 4, the blade 62 is held removably in place in the seat by screws 68 extending through the blade and threaded into the backing flange 58. The cutting edge 66 is downwardly beveled at the laterally outward side of the blade 62 to meet the opposite or inward side of the blade so as to form a relatively sharp edge 70.

As shown clearly in Figure 4, the blade 62 is supported for limited vertical oscillation in a line substantially perpendicular to the base 12, with the cutting edge 66 located on a level below the wheels 22 and 24, by a means carried by the base or bracket 42, said means comprising a short bearing shaft 72 which has on its laterally inward end a reduced shank 74 which extends slidably through an opening 76 provided in the upper part of the bearing bracket 42 and has threaded thereon a retaining nut 78 engageable with the laterally inward side of the bracket. A thrust and wear washer 80 is circumposed on the shank 74 at the outward side of the bracket 42 and is engageable by the inward end of the bearing shaft 72.

The bearing shaft 72 passes outwardly through a vertical slot 82 which is formed centrally in the blade holder plate 52, and has an enlarged retaining head 84 on its outer end to bear against the laterally outward side of the blade holder plate 52.

For imparting vertical oscillation to the blade assembly 50, an eccentric 86 is removably and non-rotatably fixed on the outward end of the motor shaft 48. The eccentric 86 comprises a body portion 88, having an axial socket 90 opening to its inward end and receiving the end of the motor shaft, and a cylindrical stub 92 eccentrically located on and projecting outwardly from the outer end of the body portion 88. Suitable means, such as a setscrew 94 traversing the body portion 88, is employed to fix the eccentric 86 on the motor shaft 48.

The stub 92 extends outwardly and rotatably through an opening 96 which is formed centrally in the apex portion 54 of the blade holder plate 52. A headed stud 98 is threaded axially into the outer end of the stub 92 and secures thereto a retaining washer 100 whose peripheral edge 102 extends laterally beyond and around the surface of the stud and bears the outer side of the holder plate 52, so as to retain the blade 50 operatively and supportable on the eccentric stub 92.

It will be apparent from the foregoing that with the motor 55 in operation, rotation of the motor shaft 48 and hence of the eccentric 86, produces vertical oscillation of the blade assembly 50, so that as the edger is moved along a pavement edge 28, the blade 62 will be vertically oscillated, relative to the bearing shaft 72 in contact with an adjacent lawn, so that the blade edge 66 cuts and shears the earth and associated grass so as to produce a neat and accurate lawn edge 30.

The form of the invention shown in Figure 5, and generally designated 10a, has a wheeled and handle equipped base 12a similar to that of Figures 1 to 4, but the bearing bracket 42a on the side edge 38a is displaced toward the rear end of the base 12a and rearwardly relative to the motor shaft, and the blade assembly 50a is swingably mounted on the bracket 42a.

The blade assembly 50a comprises a vertically foreshortened blade holder plate 52a on whose lower edge a replaceable blade 62a having an arcuate cutting edge 66a, in the manner hereinabove disclosde, and a bearing shaft 72a on the bracket 42a extends rotatably through the apex portion 54a of the blade holder plate 52a.

Oscillation of the blade assembly 50a in a vertical plane, on the axis of the bearing shaft 72a is produced by a vertical link or connecting rod 104, whose lower end is pivoted, as indicated at 106, to the adjacent forward end of the blade holder plate 52a, at the laterally outward side thereof, and whose upper end is rotatably confined, in the manner hereinabove described, on the stub 92a of an eccentric 86a secured on the shaft of the motor 44a. In this form of the invention, the blade is oscillated on a vertical plane and in forward and rearward directions longitudinally of the edger 10, so that the cutting edge 66a does its work in a rocking and shearing action, as contrasted with the chopping and shearing action of the blade of Figures 1 to 4.

In the case of both forms of the invention herein disclosed, the motors can be conveniently controlled by suitable switch means 108, mounted on the handle tubes, and suitably electrically connected to the motors.

Although there has been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A lawn edger comprising a horizontal wheeled base, having forward and rear ends and a side edge, a motor mounted upon the base and having a lateral horizontal shaft at said side edge, an eccentric fixed on said shaft and having a laterally outwardly extending stub eccentric relative to the axis of said shaft, a sector blade positioned laterally outwardly of said side edge in a vertical plane parallel to said edge, said blade having an upper apex portion journaled on said stub and an arcuate cutting edge on its lower end, a fixed bearing bracket on said base at said side edge, a horizontal bearing shaft mounted on the bracket and extending laterally outwardly therefrom beneath said eccentric, said blade assembly having a central vertical slot therein spaced below said apex portion through which said bearing shaft extends.

2. A lawn edger comprising a horizontal wheeled base having a side edge, a motor mounted on said base and having a shaft extending crosswise of and above the base and reaching toward said side edge, an eccentric fixed on said shaft, a bearing bracket fixed on said base at said side edge and beneath said shaft, a bearing shaft mounted on said bracket and extending toward said base parallel with and below the motor shaft, a vertical blade positioned outwardly of said base side edge and extending above and below said base, said blade having an upper end journaled eccentrically on said eccentric and an arcuate cutting edge on its lower end, said blade having a central vertical slot slidably and securably journaled on said bearing shaft.

References Cited in the file of this patent

UNITED STATES PATENTS

| 1,644,068 | McBride | Oct. 4, 1927 |
| 2,422,005 | Frank | June 10, 1947 |
| 2,664,807 | Hedrick | Jan. 5, 1954 |
| 2,712,719 | Martin | July 12, 1955 |
| 2,854,805 | Mollohan | Oct. 7, 1958 |
| 2,859,676 | Pottol et al. | Nov. 11, 1958 |

FOREIGN PATENTS

| 767,411 | France | July 17, 1934 |
| 774,588 | Great Britain | May 15, 1957 |